Feb. 9, 1971  J. B. JONES, JR  3,561,927

FLUID COLLECTION SYSTEM FOR VERTICAL PROCESS VESSELS

Filed Jan. 22, 1969  3 Sheets-Sheet 1

INVENTOR.
John B. Jones Jr.

BY Richard D. Law
ATTORNEY

Feb. 9, 1971 J. B. JONES, JR 3,561,927
FLUID COLLECTION SYSTEM FOR VERTICAL PROCESS VESSELS
Filed Jan. 22, 1969 3 Sheets-Sheet 3

INVENTOR.
John B. Jones Jr.
BY
Richard D. Law
ATTORNEY

United States Patent Office

3,561,927
Patented Feb. 9, 1971

3,561,927
FLUID COLLECTION SYSTEM FOR VERTICAL PROCESS VESSELS
John B. Jones, Jr., Denver, Colo., assignor to Paraho Corporation, Washington, D.C., a corporation of Nevada
Filed Jan. 22, 1969, Ser. No. 792,976
Int. Cl. B01j 9/06
U.S. Cl. 23—283
8 Claims

ABSTRACT OF THE DISCLOSURE

A fluid collection system for vertical process vessels, in which a fluid is contacted with solid content of the vessel, particularly for large diameter vessels, includes at least one series of elongated collector members symmetrically positioned across the lateral extent of the process vessel, each series being generally near the top of a reaction zone in the vessel, but in position to be completely covered by the solid material. Each of the elongated collector members includes variable opening means across its lateral extent to provide for the collection and the removal of fluids moving through the bed of solids in a direct ratio to the area of the vessel served by a particular increment of inflow into the collector. This provides for a uniform flow of the fluid through the bed across the entire lateral extent of the process vessel, thereby controlling channelling of the fluids and over treatment of some of the solids.

---

Vertical process vessels are used in numerous industries, in which one material is introduced into the top of the vertical vessel to flow by gravity to the bottom thereof, and by maintaining the feed equal to the discharge a continuous moving bed is maintained in the vessel, and a lighter material, usually a fluid, is passed upwardly through the bed for contacting the downwardly flowing material in the bed. In such vessels, a liquid may be treated with a gas, a particulate solid treated with either liquid or gas, etc. In one form, the vertical reactors are generally cylindrical with a cross-sectional configuration approximating a circle. The treatment of the material in the vertical process vessel is preferably uniform, that is, all of the material flowing downwardly through the process vessel is contacted by the fluid to the same relative extent as all other particles. A very common reaction vessel treats particulate material with a gas, and the discussion of the invention herebelow is related to such a vessel, however, the principal applies to the treatment of particulate solid material with liquids as well.

It is desirable in the operation of a vertical process vessel to provide a uniform flow of particulate material downwardly through the vessel, uniform as to the lateral extent of the vessel, whereby all the particles move downwardly through the vessel at a uniform rate. In the same manner, the treating fluid is preferably spread uniformly across the cross-sectional extent of the vessel so that it passes uniformly countercurrently or concurrently through the particulate material providing uniform contact with all the particles. While the control of the particulate material passing through the vessel and the upwardly flow of fluids is desirable, it is, also, desirable to control the disengagement of the fluids from the solids in the process vessel to thereby improve the solids fluid relationship and control channelling of the fluid, particularly in the upper part of the vessel. For large diameter vessels it is desirable to use fluid collectors or collecting channels to separate the fluids and the solids, and, also, transport the recovered fluids to a collecting manifold. The collection of fluids from beds of solids to attain the uniform flow of the fluids through the vessel, and to aid in attaining the uniform solids-fluids contacting is relatively easy in rectangular or square cross-sectional vessels, however, in vessels with circular or elliptical cross-sections it is difficult to collect and remove the fluids from the vessel without adversely affecting the cross-sectional uniform flow of fluid or without affecting solids-fluids flow relationships near the top of a reaction zone.

The present invention provides for apparatus and method for a uniform collection and removal of fluids from process vessels regardless of the vessel's cross-sectional configuration.

Included among the objects and advantages of the present invention is a method and apparatus for the collection and removal of fluids from beds of particulate solid material moving through vertical process vessels so to improve solids-fluid flow relationships in the solid beds as the fluids approach the point of disengagement from solids in the bed.

Another object of the invention is to provide an improved method of withdrawing concurrently or countercurrently flowing fluids from a downwardly moving bed of particulate, solid material such that the flow of fluid into the collector varies as direct ratio of the area of the vessel cross-section served by of the collector system.

Another object of the invention is to provide for the removal of fluids from vertical process vessels having a downwardly flow of solid, particulate matter so as to cause minimum disruption of the downwardly flow of solids in the process vessel.

Still another object of the invention is to provide for the transportation of separated treatment fluids in a vertical process vessel from the point of disengagement of the fluids from the bed of solid particulate material to the side of the vessel.

Yet another object of the invention is to provide an improved method for the collection of upwardly moving fluids in a vertical vessel whereby the materials of construction may be varied to suit the service conditions of the process being conducted within the vessel.

A still further object of the invention is to provide an improved method and construction for the removal of uprising fluids in a vertical process which vessel that is operable, economical, and serviceable.

Another object of the invention is to provide a system for producing a cross-sectionally uniform flow and withdrawal of fluids moving countercurrently to a bed of particulate material in a vertical reaction vessel.

A further object of the invention is to provide a system for producing a cross-sectionally uniform flow and withdrawal of fluids moving cocurrently with a bed of particulate material in a vertical reaction vessel.

These and other objects and advantages of the invention may be readily ascertained by referring to the following description and appended illustrations in which.

Figure 5:
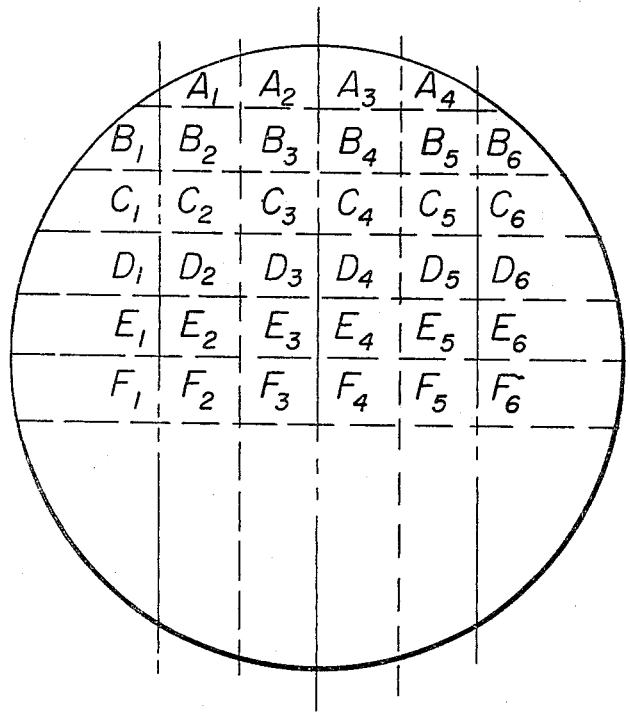
Figure 6:
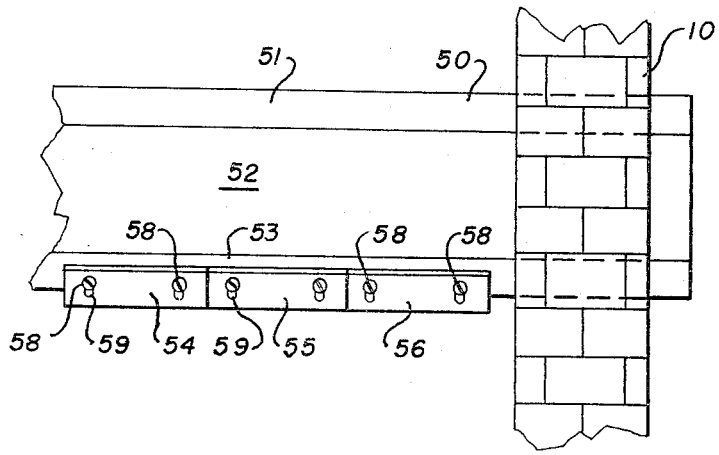

FIG. 5 is a schematic cross-sectional view of a vertical process vessel illustrating the zones across the lateral extent of the vessel serviced by a fluid collection system; and FIG. 6 is a side elevational view of one form of a collection channel illustrating the change in slot opening along the lateral extent of the channel for collecting various quantities of fluids from the cross-section of the vertical vessel.

Figure 1:
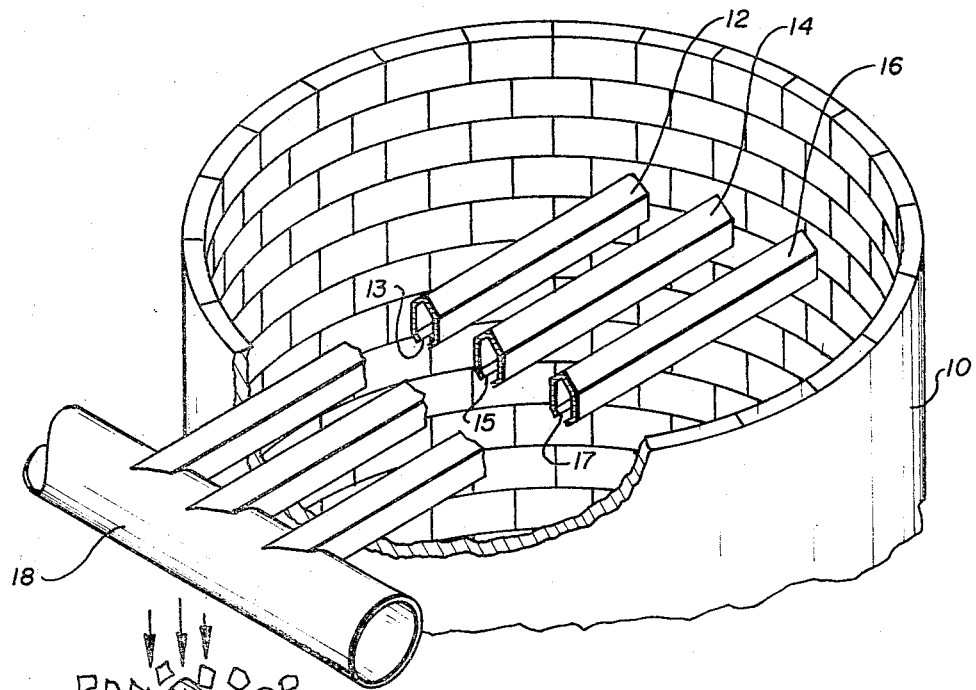
FIG. 1 is a perspective view of one form of a fluid collection system for vertical process vessel.
Figure 3:
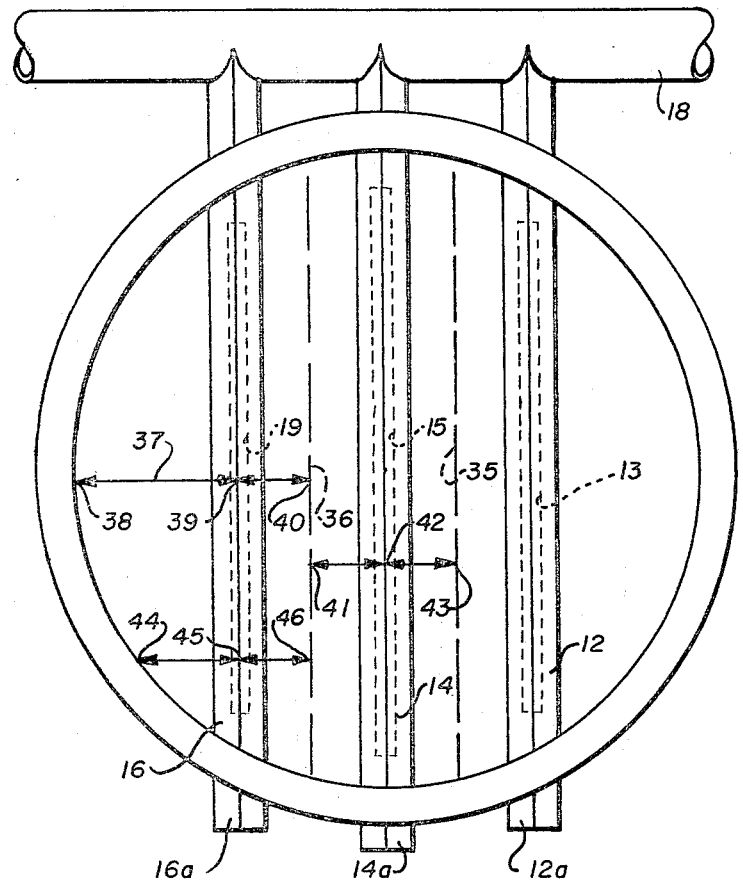
FIG. 3 is a top plan view of fluid of a collection system mounted in a circular vertical vessel.
Figure 4:
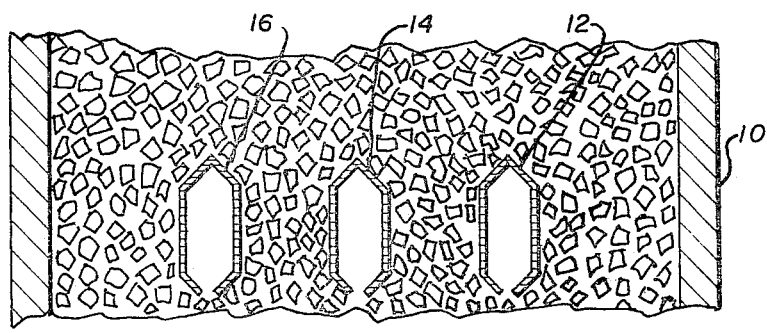
FIG. 4 is a cross-sectional view through a vertical process vessel showing the positioning of collection channels in a bed of particulate material.

In the device selected for illustration in FIG. 1, a vertical process vessel includes a vertical, cylindrical, circular wall 10 which may be made of a material suitable for the process to be conducted in the vessel. The figure shows only a portion of the vessel, with collectors near an end of a reaction zone. In vertical kilns a gas flows upwardly through a downwardly flowing bed of particulate material, and one or more reaction zones may be induced in the kiln. In some instances, gaseous products of the reaction may be withdrawn from a position near the top of the reaction zone, thus where there are two zones two collector systems are required. In countercurrent flow, the collectors are positioned above the reaction zone, and with concurrent flow they are positioned below the reaction zone. The collectors of this invention are readily adapted to this system as they are completely covered by the bed. In accordance with the art, such vertical process vessels have a solid feed mechanism for feeding particulate material generally uniformly across the lateral extent of the vessel, and some sort of a discharge means retains a bed of the material in the vessel and removes a sufficient amount of the material to maintain a moving bed of the material in the vessel. One very effective grate for a process vessel is illustrated in my Pat. No. 3,401,922, issued Sept. 17, 1968, however, other grates may be used to provide a uniform flow of solids, particulate material through the vessel. Provided in the vessel adjacent the upper part are three collector channels 12, 14 and 16 extending across the lateral extent of the vessel, through the wall and terminating at one end in a manifold 18. As shown in FIG. 3, the opposite ends of the channels are closed at 12a, 14a and 16a respectively of channels 12, 14 and 16. It is to be understood, however, that in certain instances, and particularly with large diameter vessels it may be desirable to have a manifold connected to each end. Further, it may be desirable to provide a valve, various types are useful, for each end or at least one end of the channels to adjust the flow of fluid through the channel. Furthermore, it may be desirable to provide suction on the channels from the manifold, and by the use of vanes or butterfly valves, control the flow of fluids through each of the channels in the vertical vessel. Each of the channels has an elongated slit-like opening on the bottom thereof, extending substantially across the extent of the vessel for the inflow of fluids rising through the bed of solids, thereby collecting the fluids in the channel.

Figure 2:
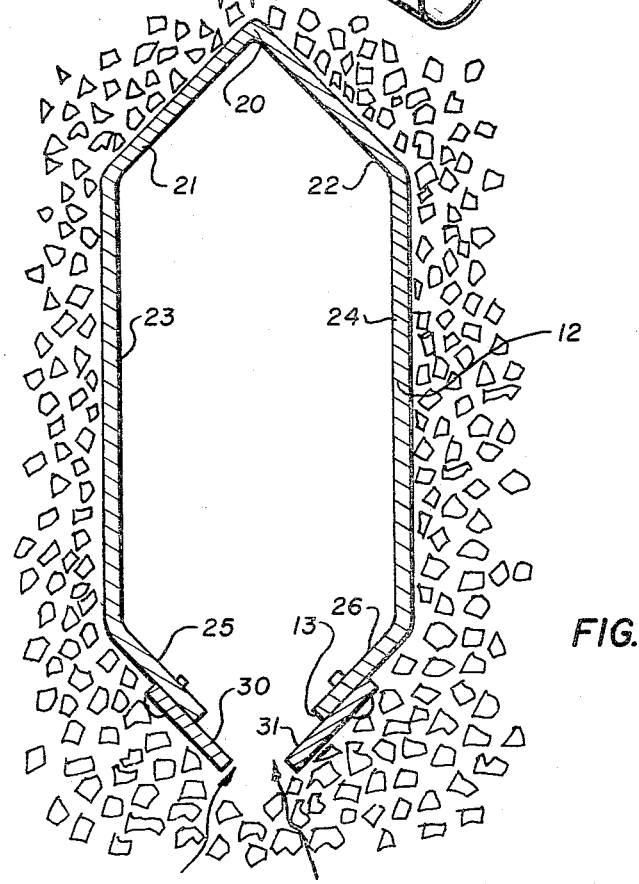
FIG. 2 is a cross-sectional view of a fluid collection channel indicating solid movement and fluid movement therearound.

One form of channel, illustrated in FIG. 2, is a six sided hollow member 12 having an elongated opening 13 at the bottom and an upper pointed ridge 20 which extends along the full extent of the channel inside the kiln. Sloped upper side walls 21 and 22 connect with vertical side walls 23 and 24 respectively. Lower side walls 25 and 26, depending from the side walls 23 and 24 respectively, terminate short of juncture leaving opening 13 therebetween. The angle at which each of the walls 21 and 22 extend from the vertical is greater than the angle of repose of the material in the vessel to prevent solid hang-up and permit a uniform flow of the particulate material around the collector. This, of course, provides minimum disruption of the flow of the solids. In the same manner, the angle at which the walls 25 and 26 extend inwardly from the side walls is less than the angle of repose of the material so as to provide a void free of the material around the opening 13 to permit ready access for the fluid from the bed into the channel. By having the angle of the lower walls less than the angle of repose reduces the possibility of fluid channelling between the bottom of the collector and the solids in the bed. The width of the opening 13 at increments across its length is controlled by means of deflector plates 30 and 31 adjustably attached to the walls 25 and 26 respectively, whereby the opening width across its length may be preadjusted for the fluid through-put desired at any particular point across the extent of the collector.

The collectors are normally arranged in a symmetrical pattern about the center line across the vessel with each collector positioned normal to the direction of the flow of the fluids and solids in the vessel. The arrangement may be other than symmetrical by adjusting the collector opening in relation with the area served by the collector. The projected width of each of the collectors should be minimal consistent with stable structural design so as to offer minimum resistance to the flow of solids through the vessel. In the same manner, the height of the collector should be minimum consistent with good structural design practice and pressure drop considerations for the transfer of the fluids to the manifold. The distance between adjacent collectors is arranged to provide a uniform collection pattern of the fluids in the vessel with the minimum dimensions between the collectors being generally controlled by the shape, size, flow characteristics, etc. of the solids flowing through the vessel. The size of the material, for example, provides a real limit on the minimum distance between the collectors since it is essential to permit a free flow of solid material between the collectors.

As illustrated in FIG. 3, three collectors are mounted in a circular cross-section vertical vessel with the central collector 14 mounted on a diameter line through the vessel and the collectors 12 and 16 spaced therefrom along chords which are parallel to the diameter or axis through the collector 14. Assuming a upperward flow of fluids through the vessel with minimum interference by the solid material it is readily seen that the center collector 14 will collect fluid from an area bounded by chords 35 and 36 which are generally equally spaced between the next adjacent collector. The area thus served by the collector 14 is generally uniform from one side to the opposite side of the vessel. The outside collectors, however, must collect the fluid from a variable area on one side and somewhat uniform area on the opposite or inner side. At the center along the diameter line 37, which is normal to the diameter line of the channel 14, the outside collectors must collect fluids from a substantial area extending to the wall of the vessel. The wall effect on the upwardly flowing fluids must, also, be considered. For uniform collection of the fluids the ratio of the width of the opening in the collector to the vessel area served, is maintained constant for all points along the axis of the collector. This provides for a uniform solids-fluid flow relationship throughout the vessel cross-section thereby providing a uniform upward flow of the fluid throughout the cross-section of the vessel. For example, in FIG. 3 the ratios of the opening width of the collector at one point divided by the length of the area served at that point is at a constant number. Thus, for line 37 the width of the opening at point 39 divided by the length of the line 38–40 is equal to the width of the opening at point 42 divided by the length of the line 41–43 which is equal to the width of the opening at point 45 divided by the line 44–46, or according to the following formula:

$$\frac{\text{Width point 39}}{\text{Length line 38–40}} = \frac{\text{Width point 42}}{\text{Length line 41–43}}$$
$$= \frac{\text{Width point 45}}{\text{Length line 44–46}} = \text{Constant}$$

On an area basis as shown in FIG. 5, the width of the opening for an increment of length along the collector divided by the areas served must be constant across the extent of the collectors in the vessel, for example, the opening of the collector between areas D1 and D2 divided by the area D1 and D2 must equal the area of the opening between areas D3 and D4 divided by the total area of D3 and D4, which in turn must equal the area opening between D5 and D6 divided by that total area D5 and D6 which is equal to the constant. The same relationship must exist across each collector in the vessel to maintain the uniform solids to fluids flow relationship. As the area served by each incremental amount increases the width of the collector opening must, also, increase.

One method of increasing the channel slot is illustrated in FIG. 6 wherein a collector 50 having a sloped wall 51 vertical side walls 52 and a sloped lower wall 53 terminating in an opening, as described for FIG. 2 is provided with baffle plates 54, 55 and 56 secured to the collector by means of bolts 58 extending through elongated slots 59 adjacent each end of the baffles to provide an adjustable collector opening across the extent of the collector. The length of the baffles may be varied to provide as many different collector slot opening changes as desired. As illustrated, the baffle 56 is pushed further down the side 53 reducing the size of the slot, each succeeding baffle therealong is moved up along the wall increasing the size of the opening towards the center of the collector where the larger size is necessary. The baffles on the opposite side are likewise adjusted. This configuration is useful for the outermost collectors, whereas the center collector may have a predetermined size of a uniform slot along its length calculated by the area serviced which is generally uniform and the process being conducted. The use of variable opening collectors, however, permits changing operating parameters of the vessels for either the same or different processes conducted in the vessel.

The number of collectors required for the fluid collections system may be one or more depending upon the size of the vessel, with the larger vessels (usually above about 12 feet in diameter) requiring more than three for the proper collection of the fluids. The material of which the collector is constructed is determined by the process conducted in the vessel. For example, if the vessel is a lime kiln, collectors made of steel may be adequate for the construction; in a chemical treatment vessel where the treatment fluid is a corrosive gas, stainless steel or other materials may be required for the construction for the collectors. Further, the collector is shown in a particular cross-sectional configuration which is easy to manufacture and maintain, as well as provide safe operation over a maximum of life span.

The collectors may have openings of a different configuration than the slot, providing the same effect of the constant ratio of area of opening of the collector divided by the area served by the opening. Collectors of circular configuration with a series of circular openings on the bottom may be useful in certain processes. Thus the cross-sectional configuration of the collector is not critical nor is the shape of the fluid inlet openings in the collectors. Minor adjustments in the above equation may be made where desirable to compensate for vessel wall-effect, etc., that may result from a particular processing operation. The openings may be made variable by any convenient means to provide versatility in the operation of the vessel. The usual controls on a vertical reaction vessel provides a controlled cross-sectionally uniform flow of fluids through the bed in vessel, but in some instances it may be desirable to provide a controlled non-uniform flow. This is conveniently provided by the variable openings in the collectors, thereby accommodating various flow patterns in the vessel.

I claim:

1. A fluid collector system for vertical process vessels having a continuously curving wall and in which a particulate solid material moves as a uniform depth bed downwardly therethrough, and a treating fluid passes upwardly through said bed, comprising: at least one transversely disposed, elongated collector member extending from one side to the opposite side of the vessel wall with at least one end of said at least one collector member extending through the wall of said vessel, and said at least one collector member arranged to be completely covered in said bed of particulate material adjacent the top of said bed; means supporting the opposite end of said at least one collector member; opening means in said at least one collector member arranged along the length of said collector member on about the bottom of said collector member and variable thereacross, said opening means arranged across the extent of said collector member to provide adjacent, variable opening areas to collect upwardly passing fluid from adjacent predetermined lateral cross-sectional areas of said vessel; the ratio of each said opening area to the adjacent predetermined lateral cross-sectional area being a substantial constant; the total of all of the predetermined lateral cross-sectional areas being generally equal to the lateral cross-sectional area of the vessel; and means for withdrawing fluid from said collector member.

2. A fluid collector system according to claim 1 wherein said at least one collector member is a plurality of said transversely disposed, elongated collector members, said plurality of collector members being arranged in generally parallel position in a single lateral plane in said vessel.

3. A fluid collector system according to claim 2 wherein said variable opening means provide adjustable inflow fluid collection varying from segment-to-segment along the length of each of said collector members.

4. A fluid collector system according to claim 2 wherein said plurality of variable opening means are arranged to provide a continuous opening in each of said collector members from adjacent one wall to adjacent the opposite wall of said vessel, and each said continuous opening varies along its length.

5. A fluid collector system according to claim 2 wherein each of said collector members includes a peaked top, substantially opposed vertical side walls and a pair of lower walls sloping inwardly from said vertical side walls, said lower walls forming a central opening therebetween communicating into the space formed by said vertical side walls, the angle at which said lower side walls slope inwardly being greater than the angle of repose of the material in the vessel.

6. A fluid collector system according to claim 5 wherein at least one of said inwardly sloping lower side walls includes a series of segmented baffles adjustably arranged side-by-side along said continuous opening to provide an adjustment for varying said opening for said vessel predetermined cross-sectional areas.

7. A fluid collector system according to claim 5 wherein a series of adjustable segmental baffles depend from both of said inwardly sloping lower side walls.

8. A fluid collector system according to claim 7 wherein said collector members extend through the vessel wall on both ends and said means for removing fluid from said collector member is a manifold exterior to the vessel connected to at least one end of each of said collector members.

References Cited

UNITED STATES PATENTS

| 2,186,675 | 1/1904 | Horak | 263—29 |
|---|---|---|---|
| 2,522,354 | 9/1950 | Fahnestock | 23—288.36 |
| 2,548,295 | 4/1951 | Fahnestock | 23—288.36 |

JAMES H. TAYMAN, Jr., Primary Examiner

U.S. Cl. X.R.

23—284, 288.1; 34—165, 168, 170; 55—79, 390; 263—29